US012639957B2

(12) United States Patent
Boehm et al.

(10) Patent No.: US 12,639,957 B2
(45) Date of Patent: May 26, 2026

(54) SURFACE DETECTION FOR A VEHICLE

(71) Applicant: Textron Inc., Providence, RI (US)

(72) Inventors: Christopher Alexander Boehm, North Augusta, SC (US); Ionut Gabriel Bungeanu, Ştefăneşti (RO)

(73) Assignee: TEXTRON INC., Providence, RI (US)

( * ) Notice: Subject to any disclaimer, the term of this patent is extended or adjusted under 35 U.S.C. 154(b) by 340 days.

(21) Appl. No.: 18/406,660

(22) Filed: Jan. 8, 2024

(65) Prior Publication Data

US 2025/0225795 A1     Jul. 10, 2025

(51) Int. Cl.
   *G06V 20/56*      (2022.01)
   *H04W 4/021*     (2018.01)
   *H04W 4/029*     (2018.01)

(52) U.S. Cl.
   CPC .......... *G06V 20/588* (2022.01); *H04W 4/021* (2013.01); *H04W 4/029* (2018.02)

(58) Field of Classification Search
None
See application file for complete search history.

(56) References Cited

U.S. PATENT DOCUMENTS

| | | |
|---|---|---|
| 5,319,368 A | 6/1994 | Poholek |
| 5,614,670 A | 3/1997 | Nazarian et al. |
| 5,736,631 A | 4/1998 | Dixon et al. |
| 6,351,988 B1 | 3/2002 | Bartlett |
| 6,962,073 B2 | 11/2005 | Hage et al. |
| 7,243,526 B2 | 7/2007 | Pringle |
| 7,513,508 B2 | 4/2009 | Malit |
| 8,327,693 B2 | 12/2012 | Scherbring |
| 8,485,037 B1 | 7/2013 | Takacs et al. |
| 8,538,667 B2 | 9/2013 | Friedlander et al. |
| 9,597,576 B2 | 3/2017 | Peterson et al. |
| 10,983,515 B2 | 4/2021 | Choe et al. |
| 11,221,323 B2 | 1/2022 | Chan et al. |
| 11,297,758 B2 | 4/2022 | Johnson et al. |
| 11,752,418 B2 | 9/2023 | Reeves |

(Continued)

FOREIGN PATENT DOCUMENTS

| | | |
|---|---|---|
| CN | 104864878 A | 8/2015 |
| CN | 110406618 B | 11/2019 |

(Continued)

*Primary Examiner* — Andrew H Lam
(74) *Attorney, Agent, or Firm* — Foley & Lardner LLP

(57)        ABSTRACT

A vehicle system includes a vehicle and a control system. The vehicle includes a chassis, a plurality of tractive assemblies coupled to the chassis, a prime mover configured to drive one or more of the plurality of tractive assemblies, a first sensor configured to facilitate monitoring a tracked location of the vehicle, and a second sensor configured to facilitate detecting a surface type of a ground surface. The control system is configured to monitor the tracked location of the vehicle based on a first signal acquired from the first sensor, determine the surface type of the ground surface based on a second signal acquired from the second sensor, and permit unrestricted operation of the vehicle when the tracked location indicates that the vehicle is located in a restricted operation area but the surface type indicates that the vehicle is not in the restricted operation area.

20 Claims, 6 Drawing Sheets

(56) References Cited

U.S. PATENT DOCUMENTS

| | | | |
|---|---|---|---|
| 2004/0260467 A1* | 12/2004 | Wehrlen | G05D 1/0282 |
| | | | 701/36 |
| 2011/0022357 A1 | 1/2011 | Vock et al. | |
| 2013/0055797 A1 | 3/2013 | Cline et al. | |
| 2013/0289896 A1 | 10/2013 | Cao et al. | |
| 2014/0257621 A1* | 9/2014 | Zych | G01C 21/20 |
| | | | 701/410 |
| 2014/0329613 A1 | 11/2014 | Savarese et al. | |
| 2014/0330496 A1 | 11/2014 | Crouse et al. | |
| 2018/0178822 A1 | 6/2018 | Carter et al. | |
| 2019/0162848 A1 | 5/2019 | Yuasa et al. | |
| 2020/0113142 A1 | 4/2020 | Coleman et al. | |
| 2022/0357154 A1 | 11/2022 | Carson et al. | |
| 2022/0413165 A1 | 12/2022 | Song | |

FOREIGN PATENT DOCUMENTS

| | | | |
|---|---|---|---|
| DK | 202200375 | A1 | 11/2022 |
| EP | 2 687 818 | B1 | 8/2018 |
| IN | 202241036994 | A | 7/2022 |
| JP | H05-337230 | A | 12/1993 |
| JP | H09-070202 | A | 3/1997 |
| JP | 2002-296036 | A | 10/2002 |
| JP | 2003-344050 | A | 12/2003 |
| JP | 2005-201903 | A | 7/2005 |
| JP | 2006-501384 | A | 1/2006 |
| JP | 4825593 | B2 | 11/2011 |
| JP | 2016-028538 | A | 2/2016 |
| JP | 2016-116598 | A | 6/2016 |
| JP | 2018-126238 | A | 8/2018 |
| JP | 2020-171451 | A | 10/2020 |
| JP | 2023-508248 | A | 3/2023 |
| KR | 950004080 | A | 2/1995 |
| KR | 200354925 | Y1 | 7/2004 |
| KR | 200445998 | Y1 | 9/2009 |
| KR | 20160145464 | A | 12/2016 |
| KR | 20220135965 | A | 10/2022 |
| KR | 20220135966 | A | 10/2022 |
| WO | WO-2017/015391 | A1 | 1/2017 |
| WO | WO-2023/150854 | A1 | 8/2023 |

* cited by examiner

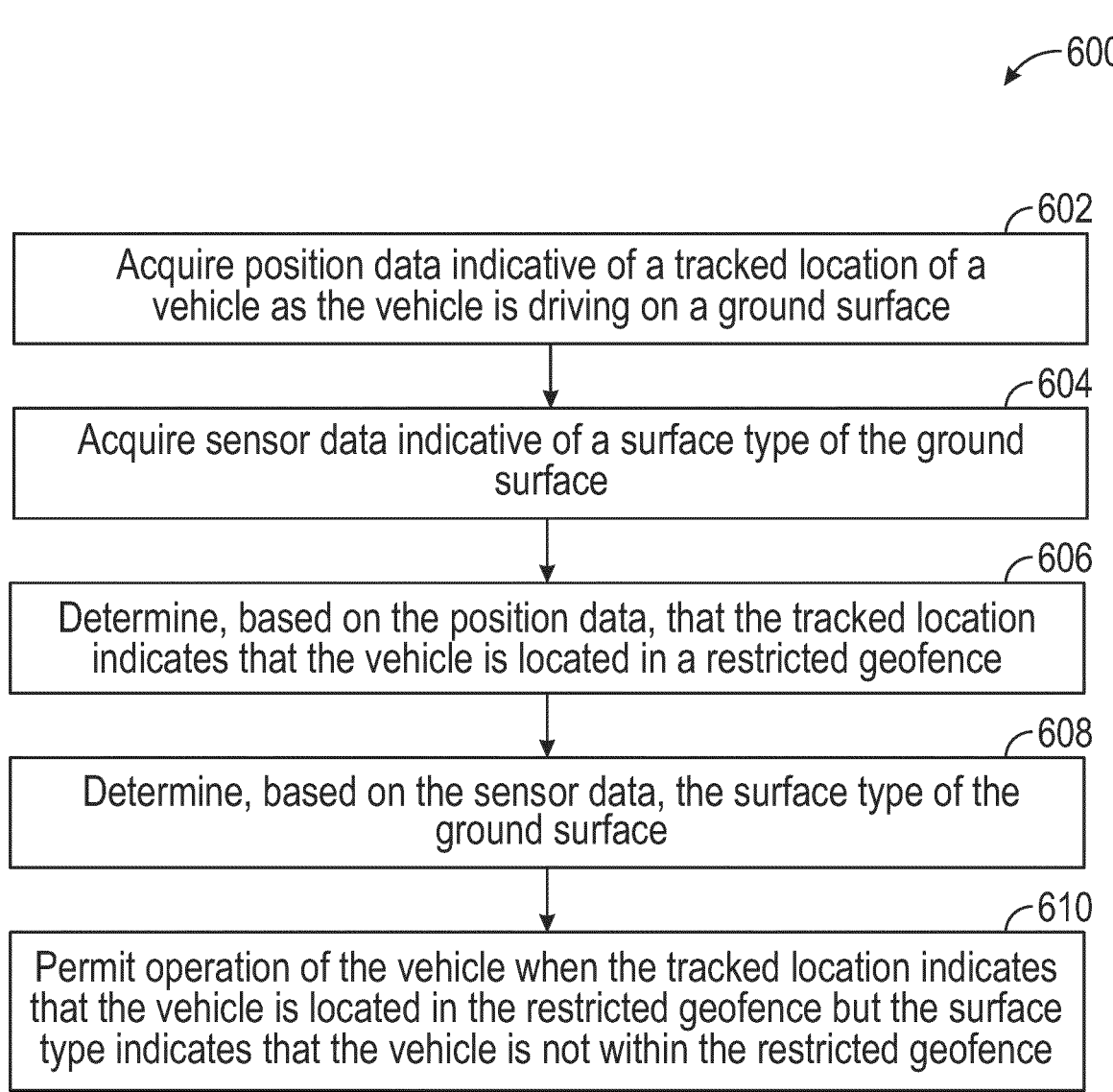

600

602

Acquire position data indicative of a tracked location of a vehicle as the vehicle is driving on a ground surface

604

Acquire sensor data indicative of a surface type of the ground surface

606

Determine, based on the position data, that the tracked location indicates that the vehicle is located in a restricted geofence

608

Determine, based on the sensor data, the surface type of the ground surface

610

Permit operation of the vehicle when the tracked location indicates that the vehicle is located in the restricted geofence but the surface type indicates that the vehicle is not within the restricted geofence

FIG. 7

SURFACE DETECTION FOR A VEHICLE

BACKGROUND

Golf carts are commonly used by golfers while playing a round of golf to drive between holes, to their ball, and to carry their bags. Other vehicles, such as drink carts, ground maintenance vehicles, recreational vehicles, utility vehicles, etc. are also commonly found at a golf course. Keep-out geofences may be established around areas of the golf course where the golf carts and other vehicles should not drive. These areas may include greens, tee boxes, buildings, water, woods, among others. When the golf cart or the other vehicles drive in the area defined by the keep-out geofence, the operation thereof may be limited.

SUMMARY

One embodiment relates to a vehicle system. The vehicle system includes a vehicle and a control system. The vehicle includes a chassis, a plurality of tractive assemblies coupled to the chassis where the plurality of tractive assemblies are configured to engage a ground surface to support the vehicle, a prime mover configured to drive one or more of the plurality of tractive assemblies, a first sensor configured to facilitate monitoring a tracked location of the vehicle, and a second sensor configured to facilitate detecting a surface type of the ground surface. The control system is configured to monitor the tracked location of the vehicle based on a first signal acquired from the first sensor, determine the surface type of the ground surface based on a second signal acquired from the second sensor, and permit unrestricted operation of the vehicle when the tracked location indicates that the vehicle is located in a restricted operation area but the surface type indicates that the vehicle is not in the restricted operation area.

Another embodiment relates to a golf cart. The golf cart includes a chassis, a plurality of tractive assemblies where each tractive assembly of the plurality of tractive assemblies including a tractive element configured to engage a ground surface, a suspension system coupling the plurality of tractive assemblies to the chassis, a prime mover configured to drive one or more tractive elements of the plurality of tractive assemblies, a sensor coupled to the golf cart where the sensor is configured monitor a characteristic of the golf cart and provide a signal based on the characteristic, and a controller configured to determine a type of the ground surface based on the signal and selectively limit or permit operation of the prime mover based on the type of the ground surface, thereby controlling operation of the golf cart based at least in part on a physical terrain on which the golf cart is operating.

Still another embodiment relates to a vehicle system. The vehicle system one or more processing circuits including one or more memory devices. The one or more memory devices store instructions thereon that, when executed by one or more processors, cause the one or more processors to acquire position data indicative of a tracked location of a vehicle as the vehicle is driving on a ground surface, acquire sensor data indicative of a surface type of the ground surface, determine, based on the position data, that the tracked location indicates that the vehicle is located in a restricted geofence, determine, based on the sensor data, the surface type of the ground surface, and permit operation of the vehicle when the tracked location indicates that the vehicle is located in the restricted geofence but the surface type indicates that the vehicle is not within the restricted geofence.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 7 is a block diagram of a method for controlling operation of the vehicle of FIG. 1, according to an exemplary embodiment.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, the vehicle of the present disclosure includes a vehicle system including a controller configured to control an operation (e.g., permit operation, limit operation, etc.) of the vehicle based on the type of surface the vehicle is driving on. A plurality of sensors may be variously positioned about the vehicle and configured to monitor one or more characteristics (e.g., location, vibration, component movements, etc.) of the vehicle. By way of example, a first sensor of the plurality of sensors may be coupled to the vehicle and configured to acquire position data indicative of a tracked location of the vehicle. By way of another example, a second sensor (e.g., an accelerometer, a linear position sensor, a potentiometer, etc.) of the plurality of sensors may be coupled to the vehicle and configured to acquire sensor data indicative of a surface type of a ground surface that the vehicle is driving on. The controller may be configured to determine, based on the position data received from the location sensor, that the tracked location indicates that the vehicle is located in a restricted area (e.g., an area defined by a keep-out geofence, areas on a golf course such as a green a tee box, a hazard, etc.). The controller may be configured to determine, based on the sensor data received from the frequency sensor, the surface type (e.g., a drivable area surface type such as the surface of a cart path) of the ground surface. The controller may be configured to permit operation of the vehicle (e.g., permit full power utilization, permit normal operation of a driveline, permit operation of the vehicle in a first mode of operation, etc.) when the tracked location indicates that the vehicle is located in the restricted area but the surface type indicates that the vehicle is not in the restricted area (e.g., on a cart path).

Overall Vehicle

Figure 1:
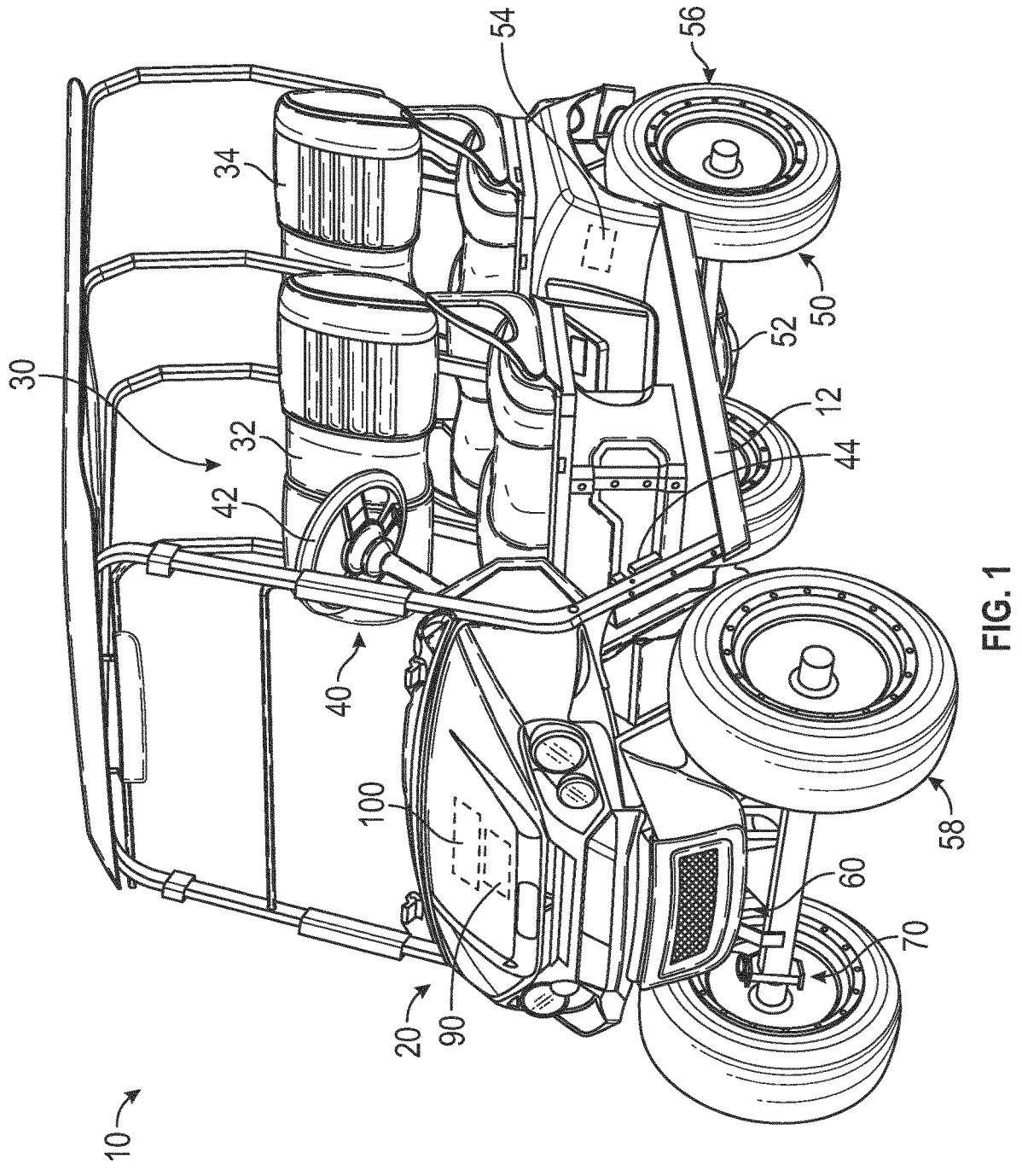
FIG. 1 is a perspective view of a vehicle, according to an exemplary embodiment.
Figure 2:
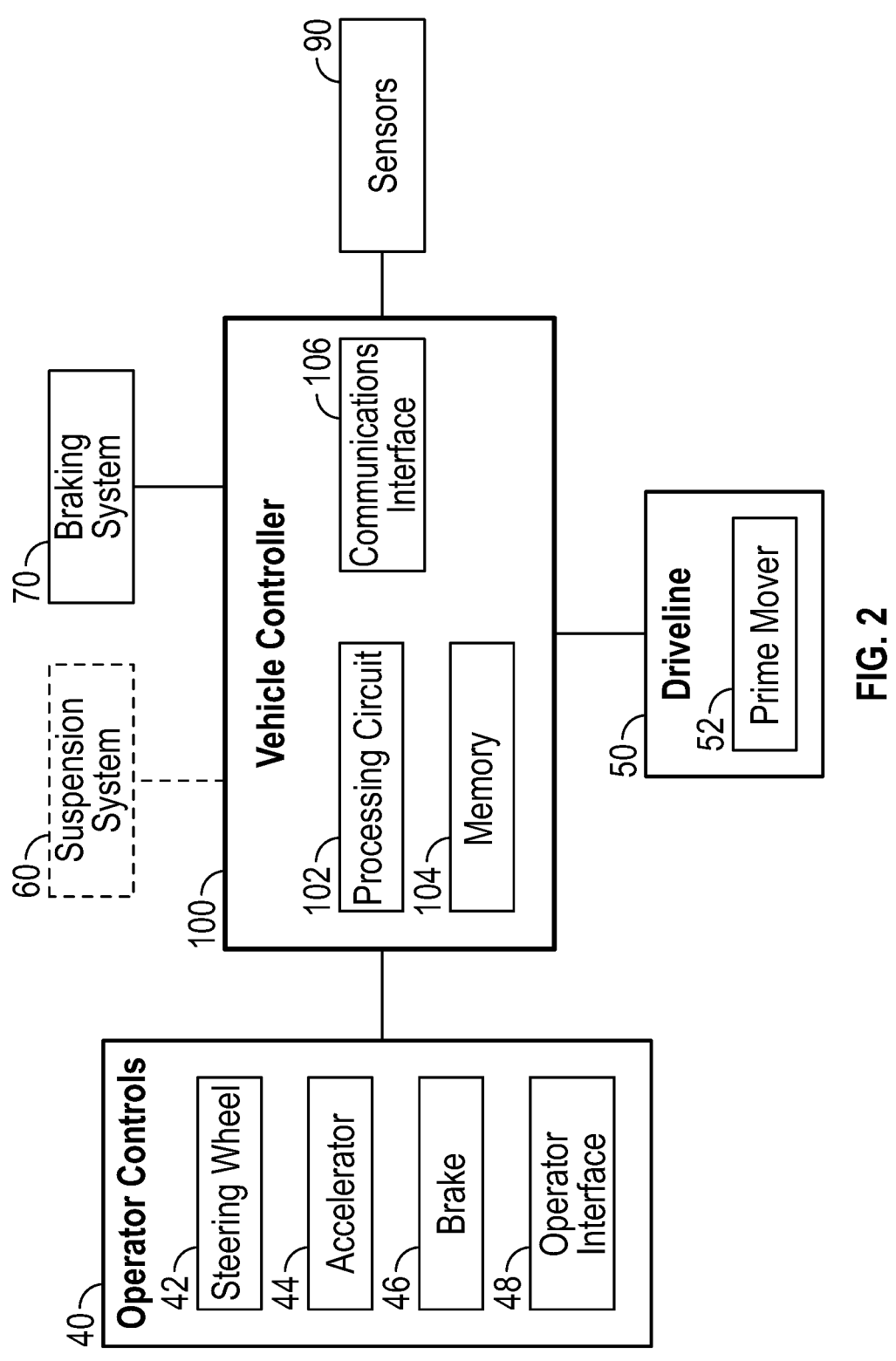
FIG. 2 is a schematic block diagram of the vehicle of FIG. 1, according to an exemplary embodiment.

As shown in FIGS. 1 and 2, a machine or vehicle, shown as vehicle 10, includes a chassis, shown as frame 12; a body assembly, shown as body 20, coupled to the frame 12 and having an occupant portion or section, shown as occupant seating area 30; operator input and output devices, shown as operator controls 40, that are disposed within the occupant seating area 30; a drivetrain, shown as driveline 50, coupled to the frame 12 and at least partially disposed under the body 20; a vehicle suspension system, shown as suspension system 60, coupled to the frame 12 and one or more components of the driveline 50; a vehicle braking system, shown as braking system 70, coupled to one or more components of the driveline 50 to facilitate selectively braking the one or more components of the driveline 50; one or more first sensors, shown as sensors 90; and a vehicle control system, shown as vehicle controller 100, coupled to the operator controls 40, the driveline 50, the suspension system 60, the braking system 70, and the sensors 90. In some embodiments, the vehicle 10 includes more or fewer components.

According to an exemplary embodiment, the vehicle 10 is an off-road machine or vehicle. In some embodiments, the off-road machine or vehicle is a lightweight or recreational machine or vehicle such as a golf cart, an all-terrain vehicle ("ATV"), a utility task vehicle ("UTV"), and/or another type of lightweight or recreational machine or vehicle. In some embodiments, the off-road machine or vehicle is a chore product such as a lawnmower, a turf mower, a push mower, a ride-on mower, a stand-on mower, aerator, turf sprayers, bunker rake, and/or another type of chore product (e.g., that may be used on a golf course).

According to the exemplary embodiment shown in FIG. 1, the occupant seating area 30 includes a plurality of rows of seating including a first row of seating, shown as front row seating 32, and a second row of seating, shown as rear row seating 34. In some embodiments, the occupant seating area 30 includes a third row of seating or intermediate/middle row seating positioned between the front row seating 32 and the rear row seating 34. According to the exemplary embodiment shown in FIG. 1, the rear row seating 34 is facing forward. In some embodiments, the rear row seating 34 is facing rearward. In some embodiments, the occupant seating area 30 does not include the rear row seating 34. In some embodiments, in addition to or in place of the rear row seating 34, the vehicle 10 includes one or more rear accessories. Such rear accessories may include a golf bag rack, a bed, a cargo body (e.g., for a drink cart), and/or other rear accessories.

According to an exemplary embodiment, the operator controls 40 are configured to provide an operator with the ability to control one or more functions of and/or provide commands to the vehicle 10 and the components thereof (e.g., turn on, turn off, drive, turn, brake, engage various operating modes, raise/lower an implement, etc.). As shown in FIGS. 1 and 2, the operator controls 40 include a steering interface (e.g., a steering wheel, joystick(s), etc.), shown steering wheel 42, an accelerator interface (e.g., a pedal, a throttle, etc.), shown as accelerator 44, a braking interface (e.g., a pedal), shown as brake 46, and one or more additional interfaces, shown as operator interface 48. The operator interface 48 may include one or more displays and one or more input devices. The one or more displays may be or include a touchscreen, a LCD display, a LED display, a speedometer, gauges, warning lights, etc. The one or more input device may be or include buttons, switches, knobs, levers, dials, etc.

According to an exemplary embodiment, the driveline 50 is configured to propel the vehicle 10. As shown in FIGS. 1 and 2, the driveline 50 includes a primary driver, shown as prime mover 52, an energy storage device, shown as energy storage 54, a first tractive assembly (e.g., axles, wheels, tracks, differentials, etc.), shown as rear tractive assembly 56, and a second tractive assembly (e.g., axles, wheels, tracks, differentials, etc.), shown as front tractive assembly 58. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system. According to the exemplary embodiment shown in FIG. 1, the rear tractive assembly 56 includes rear tractive elements and the front tractive assembly 58 includes front tractive elements that are configured as wheels. In some embodiments, the rear tractive elements and/or the front tractive elements are configured as tracks.

According to an exemplary embodiment, the prime mover 52 is configured to provide power to drive the rear tractive assembly 56 and/or the front tractive assembly 58 (e.g., to provide front-wheel drive, rear-wheel drive, four-wheel drive, and/or all-wheel drive operations). In some embodiments, the driveline 50 includes a transmission device (e.g., a gearbox, a continuous variable transmission ("CVT"), etc.) positioned between (a) the prime mover 52 and (b) the rear tractive assembly 56 and/or the front tractive assembly 58. The rear tractive assembly 56 and/or the front tractive assembly 58 may include a drive shaft, a differential, and/or an axle. In some embodiments, the rear tractive assembly 56 and/or the front tractive assembly 58 include two axles or a tandem axle arrangement. In some embodiments, the rear tractive assembly 56 and/or the front tractive assembly 58 are steerable (e.g., using the steering wheel 42). In some embodiments, both the rear tractive assembly 56 and the front tractive assembly 58 are fixed and not steerable (e.g., employ skid steer operations).

In some embodiments, the driveline 50 includes a plurality of prime movers 52. By way of example, the driveline 50 may include a first prime mover 52 that drives the rear tractive assembly 56 and a second prime mover 52 that drives the front tractive assembly 58. By way of another example, the driveline 50 may include a first prime mover 52 that drives a first one of the front tractive elements, a second prime mover 52 that drives a second one of the front tractive elements, a third prime mover 52 that drives a first one of the rear tractive elements, and/or a fourth prime mover 52 that drives a second one of the rear tractive elements. By way of still another example, the driveline 50 may include a first prime mover 52 that drives the front tractive assembly 58, a second prime mover 52 that drives a first one of the rear tractive elements, and a third prime mover 52 that drives a second one of the rear tractive elements. By way of yet another example, the driveline 50 may include a first prime mover 52 that drives the rear tractive assembly 56, a second prime mover 52 that drives a first one of the front tractive elements, and a third prime mover 52 that drives a second one of the front tractive elements.

According to an exemplary embodiment, the suspension system 60 includes one or more suspension components (e.g., shocks, dampers, springs, etc.) positioned between the frame 12 and one or more components (e.g., tractive elements, axles, etc.) of the rear tractive assembly 56 and/or the front tractive assembly 58. In some embodiments, the vehicle 10 does not include the suspension system 60.

According to an exemplary embodiment, the braking system 70 includes one or more braking components (e.g., disc brakes, drum brakes, in-board brakes, axle brakes, etc.) positioned to facilitate selectively braking one or more components of the driveline 50. In some embodiments, the one or more braking components include (i) one or more front braking components positioned to facilitate braking one or more components of the front tractive assembly 58 (e.g., the front axle, the front tractive elements, etc.) and (ii) one or more rear braking components positioned to facilitate braking one or more components of the rear tractive assembly 56 (e.g., the rear axle, the rear tractive elements, etc.). In some embodiments, the one or more braking components include only the one or more front braking components. In some embodiments, the one or more braking components include only the one or more rear braking components. In some embodiments, the one or more front braking components include two front braking components, one positioned to facilitate braking each of the front tractive elements. In some embodiments, the one or more rear braking components include two rear braking components, one positioned to facilitate braking each of the rear tractive elements.

The sensors 90 may include various sensors positioned about the vehicle 10 to acquire vehicle information or vehicle data regarding operation of the vehicle 10 and/or the location thereof. By way of example, the sensors 90 may include an accelerometer, a gyroscope, a compass, a position sensor (e.g., a GPS sensor, etc.), suspension sensor(s), wheel sensors, an audio sensor or microphone, a camera, an optical sensor, a proximity detection sensor, and/or other sensors to facilitate acquiring vehicle information or vehicle data regarding operation of the vehicle 10 and/or the location thereof. According to an exemplary embodiment, one or more of the sensors 90 are configured to facilitate detecting and obtaining vehicle telemetry data including position of the vehicle 10, whether the vehicle 10 is moving, travel direction of the vehicle 10, slope of the vehicle 10, speed of the vehicle 10, vibrations experienced by the vehicle 10, sounds proximate the vehicle 10, suspension travel of components of the suspension system 60, and/or other vehicle telemetry data.

The vehicle controller 100 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 2, the vehicle controller 100 includes a processing circuit 102, a memory 104, and a communications interface 106. The processing circuit 102 may include an ASIC, one or more FPGAs, a DSP, circuits containing one or more processing components, circuitry for supporting a microprocessor, a group of processing components, or other suitable electronic processing components. In some embodiments, the processing circuit 102 is configured to execute computer code stored in the memory 104 to facilitate the activities described herein. The memory 104 may be any volatile or non-volatile or non-transitory computer-readable storage medium capable of storing data or computer code relating to the activities described herein. According to an exemplary embodiment, the memory 104 includes computer code modules (e.g., executable code, object code, source code, script code, machine code, etc.) configured for execution by the processing circuit 102. In some embodiments, the vehicle controller 100 may represent a collection of processing devices. In such cases, the processing circuit 102 represents the collective processors of the devices, and the memory 104 represents the collective storage devices of the devices.

In one embodiment, the vehicle controller 100 is configured to selectively engage, selectively disengage, control, or otherwise communicate with components of the vehicle 10 (e.g., via the communications interface 106, a controller area network ("CAN") bus, etc.). According to an exemplary embodiment, the vehicle controller 100 is coupled to (e.g., communicably coupled to) components of the operator controls 40 (e.g., the steering wheel 42, the accelerator 44, the brake 46, the operator interface 48, etc.), components of the driveline 50 (e.g., the prime mover 52), components of the braking system 70, and the sensors 90. By way of example, the vehicle controller 100 may send and receive signals (e.g., control signals, location signals, etc.) with the components of the operator controls 40, the components of the driveline 50, the components of the braking system 70, the sensors 90, and/or remote systems or devices (via the communications interface 106 as described in greater detail herein).

Site Monitoring and Control System

Figure 3:
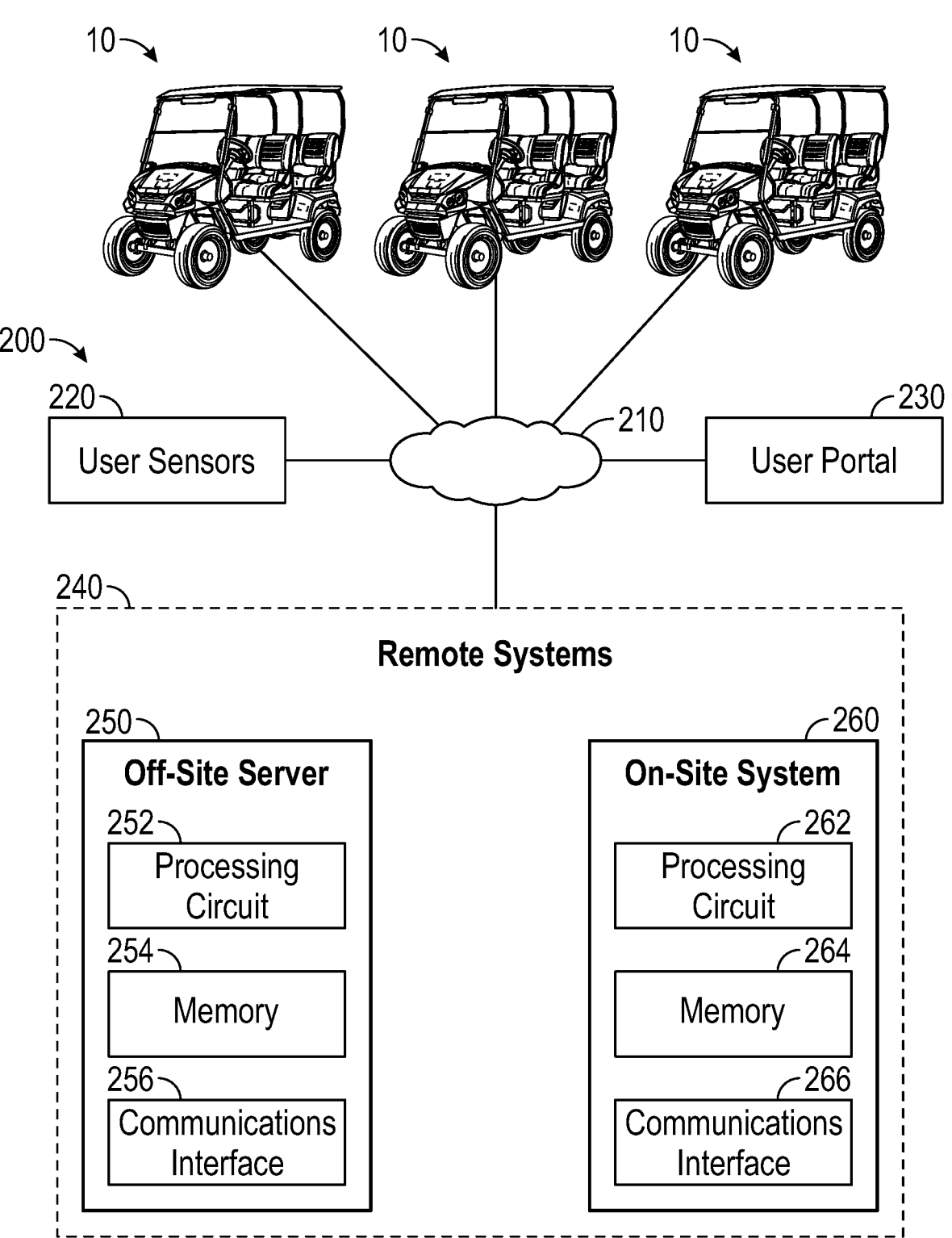
FIG. 3 is a is schematic block diagram of a site monitoring and control system including a plurality of the vehicles of FIG. 1, according to an exemplary embodiment.

As shown in FIG. 3, a monitoring and control system, shown as site monitoring and control system 200, includes one or more vehicles 10; one or more second sensors, shown as user sensors 220, positioned remote or separate from the vehicles 10; an operator interface, shown as user portal 230, positioned remote or separate from the vehicles 10; and one or more external processing systems, shown as remote systems 240, positioned remote or separate from the vehicles 10. The vehicles 10, the user sensors 220, the user portal 230, and the remote systems 240 communicate via one or more communications protocols (e.g., Bluetooth, Wi-Fi, cellular, radio, through the Internet, etc.) through a network, shown as communications network 210.

The user sensors 220 may be or include one or more sensors that are carried by or worn by an operator of one of the vehicles 10. By way of example, the user sensors 220 may be or include a wearable sensor (e.g., a smartwatch, a fitness tracker, a pedometer, hear rate monitor, etc.) and/or a sensor that is otherwise carried by the operator (e.g., a smartphone, etc.) that facilitates acquiring and monitoring operator data (e.g., physiological conditions such a temperature, heartrate, breathing patterns, etc.; location; movement; etc.) regarding the operator. The user sensors 220 may communicate directly with the vehicles 10, directly with the remote systems 240, and/or indirectly with the remote systems 240 (e.g., through the vehicles 10 as an intermediary).

The user portal 230 may be configured to facilitate operator access to dashboards including the vehicle data, the operator data, information available at the remote systems 240, etc. to manage and operate the site (e.g., golf course) such as for advanced scheduling purposes, to identify persons braking course guidelines or rules, to monitor locations of the vehicles 10, etc. The user portal 230 may also be configured to facilitate operator implementation of configurations and/or parameters for the vehicles 10 and/or the site (e.g., setting speed limits, setting geofences, etc.). The user portal 230 may be or may be accessed via a computer, laptop, smartphone, tablet, or the like.

As shown in FIG. 3, the remote systems 240 include a first remote system, shown as off-site server 250, and a second remote system, shown as on-site system 260 (e.g., in a clubhouse of a golf course, on the golf course, etc.). In some embodiments, the remote systems 240 include only one of the off-site server 250 or the on-site system 260. As shown in FIG. 3, (a) the off-site server 250 includes a processing circuit 252, a memory 254, and a communications interface 256 and (b) the on-site system 260 includes a processing circuit 262, a memory 264, and a communications interface 266.

According to an exemplary embodiment, the remote systems 240 (e.g., the off-site server 250 and/or the on-site system 260) are configured to communicate with the vehicles 10 and/or the user sensors 220 via the communications network 210. By way of example, the remote systems 240 may receive the vehicle data from the vehicles 10 and/or the operator data from the user sensors 220. The remote systems 240 may be configured to perform back-end processing of the vehicle data and/or the operator data. The remote systems 240 may be configured to monitor various global positioning system ("GPS") information and/or real-time kinematics ("RTK") information (e.g., position/location, speed, direction of travel, geofence related information, etc.) regarding the vehicles 10 and/or the user sensors 220. The remote systems 240 may be configured to transmit information, data, commands, and/or instructions to the vehicles 10. By way of example, the remote systems 240 may be configured to transmit GPS data and/or RTK data based on the GPS information and/or RTK information to the vehicles 10 (e.g., which the vehicle controllers 100 may use to make control decisions). By way of another example, the remote systems 240 may send commands or instructions to the vehicles 10 to implement.

According to an exemplary embodiment, the remote systems 240 (e.g., the off-site server 250 and/or the on-site system 260) are configured to communicate with the user portal 230 via the communications network 210. By way of example, the user portal 230 may facilitate (a) accessing the remote systems 240 to access data regarding the vehicles 10 and/or the operators thereof and/or (b) configuring or setting operating parameters for the vehicles 10 (e.g., geofences, speed limits, times of use, permitted operators, etc.). Such operating parameters may be propagated to the vehicles 10 by the remote systems 240 (e.g., as updates to settings) and/or used for real time control of the vehicles 10 by the remote systems 240.

Surface Detection

According to an exemplary embodiment, the site monitoring and control system 200, including the vehicle controller 100, the user sensors 220, the user portal 230, and the remote systems 240, is configured to facilitate improving or enhancing location detection of the vehicles and associated control thereof based on location. Further, it should be understood that any of the functions or processes described herein with respect to the site monitoring and control system 200 may be performed by the vehicle controller 100 and/or the remote systems 240. By way of example, data collection may be performed by the vehicle controller 100 and data analytics may be performed by the vehicle controller 100. By way of another example, data collection may be performed by the vehicle controller 100 and data analytics may be performed by the remote systems 240. By way of yet another example, data collection may be performed by the vehicle controller 100, a first portion of data analytics may be performed by the vehicle controller 100, and a second portion of data analytics may be performed by the remote systems 240. By way of still another example, a first portion of data collection may be performed by the vehicle controller 100, a second portion of data collection may be performed by the remote systems 240, and data analytics may be performed by the vehicle controller 100 and/or the remote systems 240.

Figure 4:
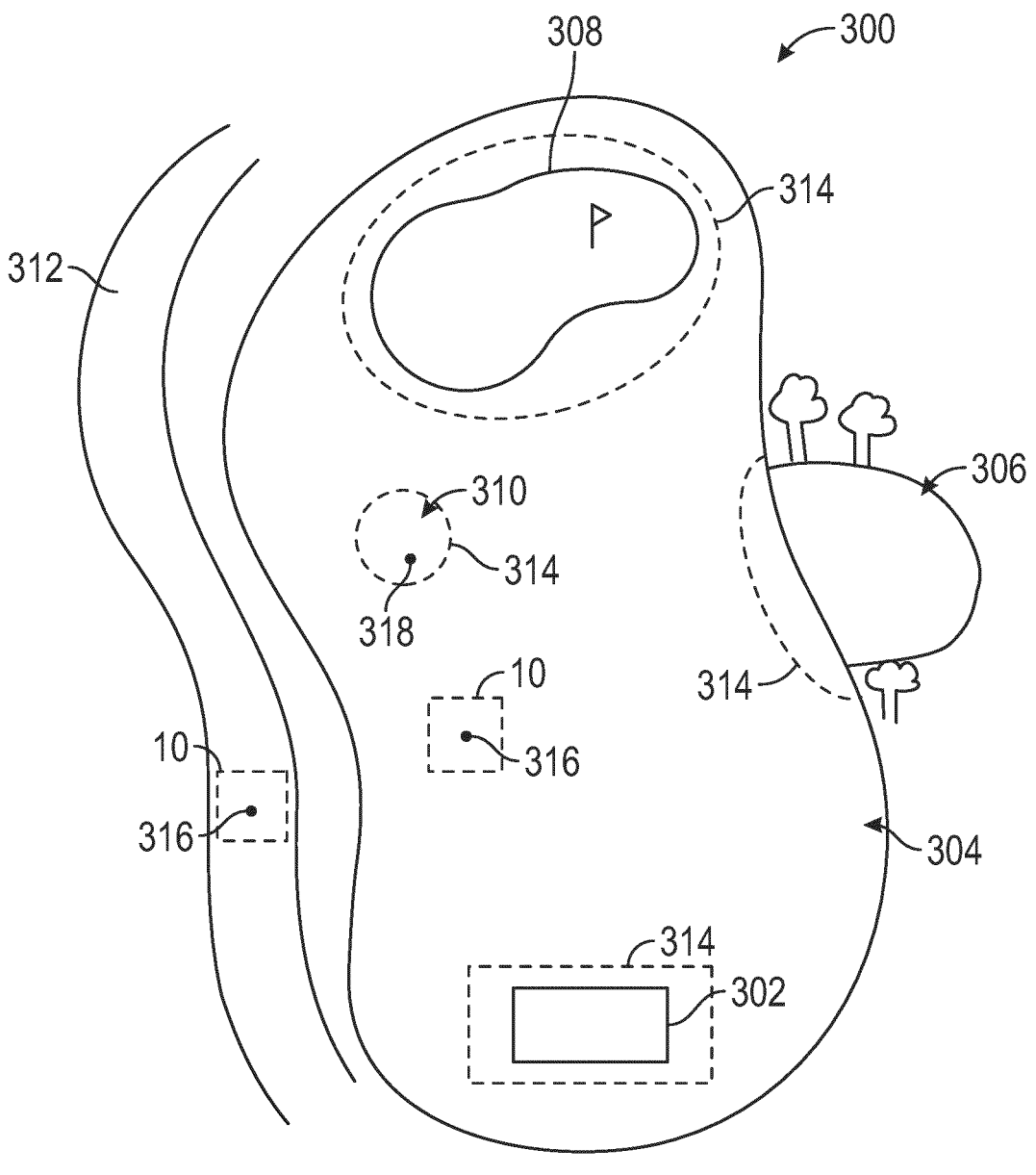
FIG. 4 is a top view of a golf course including the vehicle of FIG. 1, according to an exemplary embodiment.

As shown in FIG. 4, the vehicle 10 may be a golf cart driven by an operator playing golf on a golf course 300. In some embodiments, the vehicle 10 is a drink cart, a cart driven by an employee of the golf course 300 monitoring the pace of play of golfers, a cart driven by the maintenance crew working at the golf course 300, or another type of vehicle or vehicle commonly found at golf courses (e.g., a turf mower, a sprayer, an aerator, a bunker rake, etc.). A hole of the golf course 300 is shown including a tee box 302; a fairway 304; a water hazard, woods, fescue, etc., shown as out-of-bounds area 306; a putting green, shown as green 308; an area in the fairway 304 that is under repair, a non-playable area, etc., shown as hazard 310; and a path, a trail, a cart route, etc., shown as cart path 312.

The golf course 300 includes areas that should not be driven on, in, or around by the vehicle 10. By way of example, these areas may include the tee box 302, the out-of-bounds area 306, the fairway 304 during certain conditions (e.g., rain, flooding, under repair, etc.), the green 308, the hazard 310, private property along the golf course 300, a club house of the golf course 300, and/or another area of the golf course 300. Driving on, in, or around these areas by the vehicle 10 may damage the golf course 300, be dangerous for an operator of the vehicle 10, damage the vehicle 10, be illegal (e.g., trespassing on private property), etc. Collectively, these areas are hereinafter referred to as restricted areas. Accordingly, one or more geofences (e.g., a virtual boundary, a virtual fence, etc.), shown as geofence 314, may be established around the restricted areas. The geofences 314 may be areas or boundaries defined around the restricted areas to control and manage the operation of the vehicle 10 on the golf course 300. By way of example, when the vehicle 10 is driven beyond the virtual boundary of the geofence 314 (i.e., driven into a restricted area), the operation of the prime mover 52 of the vehicle 10 may be limited (e.g., limit speeds below 5 miles per hour, prevent forward travel of the vehicle 10, limit the vehicle 10 to backward travel only, disabled, limited or restricted operation, etc.). Areas of the golf course 300, such as the cart path 312, a parking lot of the golf course 300, the fairway 304, a cart return area, etc. that are not restricted areas defined by a geofence 314 may be drivable (e.g., navigable, permitted, unrestricted operation, etc.) by the vehicle 10, and are hereinafter referred to as the drivable areas. In some embodiments, a cart path only rule may be implemented where the vehicle 10 is supposed to drive on the cart path 312 only (e.g., after or during heavy rainfall). In such an embodiment, the geofence 314 may be established everywhere except for the cart path 312.

An employee of the golf course 300 (e.g., an operator of the on-site system, an operator of the off-site system, etc.) may establish the geofences 314 using the user portal 230. The geofence 314 may be input into the user portal 230 (e.g., drawn on a display of a map of the golf course 300, boundary coordinates, etc.) such that the remote systems 240 can monitor GPS data and/or RTK data (e.g., location, proximity, position, etc.) of one or more vehicles 10 on the golf course 300 relative to the established geofences 314. The remote systems 240 may provide data associated with the geofence 314, the GPS data, and/or the RTK data to the vehicle controller 100 of the vehicle 10 through the communications interface 106. The operator interface 48 may display, based on data received by the vehicle controller 100 from the remote systems 240, a map of the golf course 300, a real-time position of the vehicle 10 within the map of the golf course 300, and the locations of the one or more geofences 314 established throughout the golf course 300.

The site monitoring and control system 200 (e.g., the vehicle controller 100, the remote systems 240, etc.) may control an operation of the operator controls 40, the driveline 50, the suspension system 60, the braking system 70, and/or any other component of the vehicle 10 based on the GPS data and/or the RTK data of the vehicle 10 relative to the geofences 314. By way of example, the site monitoring and control system 200 may determine, based on the GPS data and/or the RTK data, that the vehicle 10 is operating (e.g., driving forward, driving backward, idling, stopped, parked, etc.) (i) in s drivable area, (ii) near a geofence 314 (e.g., within 5 yards of the geofence 314, within 10 yards of the geofence 314, etc.), and (iii) in a restricted area defined by the geofence 314. In response to a determination that the vehicle 10 is operating in a drivable area, the site monitoring and control system 200 may facilitate (e.g., permit operation of the vehicle 10 in a first mode of operation) normal or unrestricted operation of the operator controls 40, driveline 50, the suspension system 60, the braking system 70, and/or any other component of the vehicle 10. In response to a determination that the vehicle 10 is operating near or in the geofence 314, the site monitoring and control system 200 may limit operation (e.g., limit operation of the vehicle 10 in a second mode of operation) of the operator controls 40, driveline 50, the suspension system 60, the braking system 70, and/or any other component of the vehicle 10. By way of example, the site monitoring and control system 200 may limit operation of the prime mover 52 such that the vehicle 10 (i) cannot exceed a threshold speed (e.g., 5 miles per hour, 2 miles per hour, etc.), (ii) is limited to rearward travel, and/or (iii) any other control to limit operation of the vehicle 10. In some embodiments, in response to a determination by the site monitoring and control system 200 that the vehicle 10 is operating near the geofence 314, the operator interface 48 may display a warning providing an indication to the operator of the vehicle 10 of the geofence 314 (e.g., warning the operator of the location of the geofence 314, warning the operator that the vehicle 10 is approaching the geofence 314, etc.). In some embodiments, in response to a determination by the site monitoring and control system 200 that the vehicle 10 is operating in the geofence 314, the operator interface 48 may display a warning providing instructions to the operator to navigate the vehicle 10 out of the geofence 314. In some embodiments, in response to a determination by site monitoring and control system 200 that the vehicle 10 is operating in the geofence 314, the operator interface 48 and/or the user portal 230 may display a warning, a distance indicating how far the vehicle 10 has traveled in the geofence 314, and/or a time indicating how long the vehicle

10 has been operating in the geofence 314. The parameters for triggering such warning may be set using the user portal 230. In some embodiments, in response to a determination by the site monitoring and control system 200 that the vehicle 10 is operating in the geofence 314, the site monitoring and control system 200 may disable/limit the vehicle 10, provide the warning on the operator interface 48, and/or provide the warning on the user portal 230.

As shown in FIG. 4, a location (e.g., real-time location, true location, etc.), shown as true location 316, of the vehicle 10 may be different than a location of the vehicle 10 determined by the sensors 90 and/or the user sensors 220 and monitored by the site monitoring and control system 200 (e.g., location of the vehicle 10 based on GPS data and/or RTK data collected by the sensors 90 and/or the user sensors 220), shown as tracked location 318. The true location 316 may be different from the tracked location 318. This difference may be caused by signal interference (e.g., geomagnetic radiation), solar storms, signal obstruction (e.g., tree cover, building cover, etc.), weather (e.g., rain, snow, pressure, etc.), control system quality (e.g., range of the communications interface 106), malfunctioning sensors, and/or any other combination of technical or external factors. In some embodiments, the difference between the true location 316 and the tracked location 318 is referred to as location or GPS drift. Because of the difference between the true location 316 and the tracked location 318, the site monitoring and control system 200 may determine, based on the tracked location 318, that the vehicle 10 is operating in a restricted area defined by a respective geofence 314 when in reality, the true location 316 of the vehicle 10 is not in the restricted area. In such an example, the site monitoring and control system 200 may undesirably limit the operation of the vehicle 10. Similarly, because of the difference between the true location 316 and the tracked location 318, the site monitoring and control system 200 may determine, based on the tracked location 318, that the vehicle 10 is not operating in the restricted area (e.g., operating in the drivable area) defined by the geofence 314 when in reality, the true location 316 of the vehicle 10 is in the restricted area. In such an example, the site monitoring and control system 200 may undesirably permit operation of the vehicle 10.

To correct (e.g., adjust for, account for, etc.) the undesirable controlling of the operation of the vehicle 10 as a result of the GPS drift, the site monitoring and control system 200 is configured to determine a type of ground surface that the vehicle 10 is operating (e.g., traveling, traversing, etc.) on based on sensor data received from the sensors 90 and/or the user sensors 220 to selectively limit or permit operation of the vehicle 10 based on the type of the ground surface. Controlling operation of the vehicle 10 based on the type of the ground surface ensures that the difference between the true location 316 and the tracked location 318 caused by GPS drift does not adversely affect operation of the vehicle 10 (e.g., limiting driving operations of the vehicle when the vehicle 10 is in the drivable areas, permitting driving operations of the vehicle 10 when the vehicle 10 is in the restricted areas, etc.).

According to an exemplary embodiment, one or more sensors 90 may be coupled to the vehicle 10 at various locations. The sensors 90 are configured to monitor a characteristic (e.g., a vibration experienced, a linear displacement of a component of the suspension system 60, a linear displacement of one or more tractive elements of the rear tractive assembly 56, a linear displacement of one or more tractive elements of the front tractive assembly 58, etc.) of the vehicle 10 and provide a signal associated with the characteristic to the site monitoring and control system 200. According to another exemplary embodiment, one or more user sensors 220 carried by an operator of the vehicle 10 (e.g., carried in a pocket of the operator, worn by the operator, stored in a storage compartment of the vehicle 10, etc.) are configured to monitor a characteristic (e.g., a vibration experienced) of the vehicle 10 and provide a signal associated with the characteristic to the site monitoring and control system 200. Based on the signal associated with the characteristic, the site monitoring and control system 200 may determine the type of ground surface that the vehicle 10 is operating on.

Figure 5:
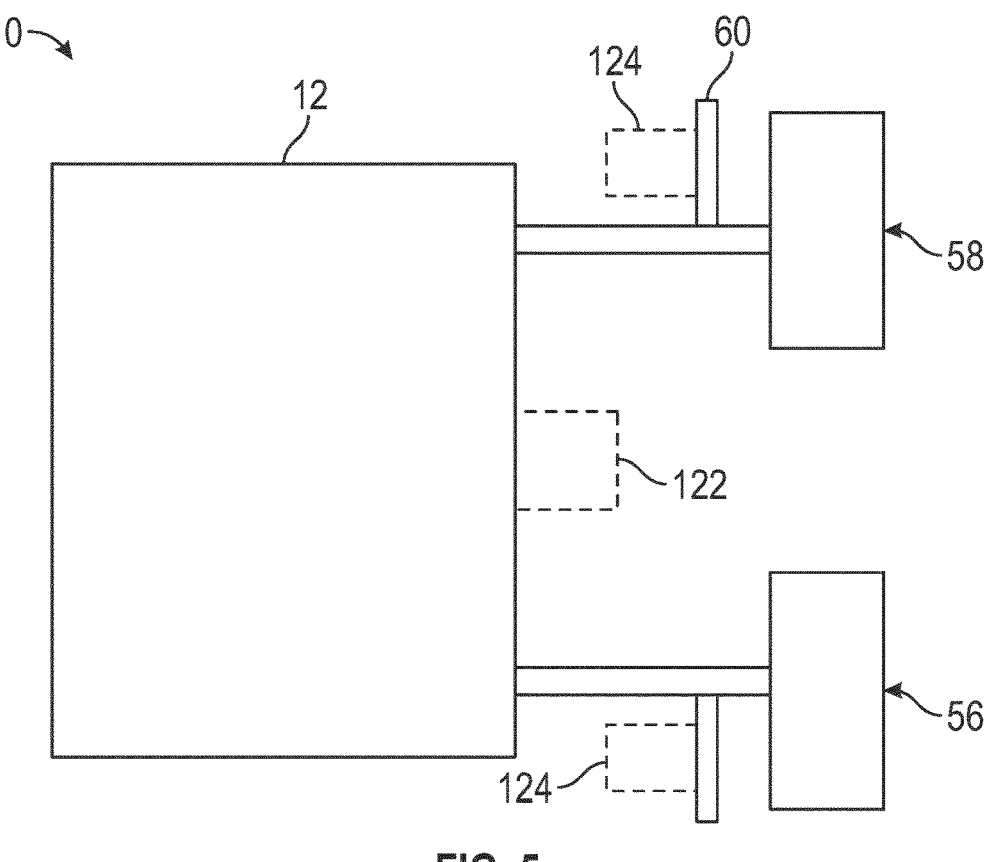
FIG. 5 is a block diagram of a sensor coupled to one or more portions of the vehicle of FIG. 1, according to an exemplary embodiment.

As shown in FIG. 5, the sensors 90 include a vibration sensor (e.g., piezoelectric accelerometer, strain gauge accelerometer, etc.), shown as accelerometer 122, coupled to the frame 12 of the vehicle 10. In some embodiments, the accelerometer 122 is coupled to the body 20, the occupant seating area 30, a component of the rear tractive assembly 56, a component of the front tractive assembly 58, a component of the suspension system 60, a component of the operator interface 48, and/or another component of the vehicle 10. In some embodiments, two or more accelerometers 122 are coupled to the vehicle 10 at various locations. The accelerometer 122 is configured to monitor vibrations experienced by the vehicle 10 and/or the component the vehicle 10 to which the accelerometer 122 is coupled. The accelerometer 122 may detect changes in motion (e.g., velocity, acceleration, vibration, etc.) and provide a signal associated with the vibrations experienced to the site monitoring and control system 200. In some embodiments, the user sensor 220 is configured as a vibration sensor (e.g., the accelerometer 122). In such an embodiment, the accelerometer 122 may detect changes in motion (e.g., velocity, acceleration, vibration, etc.) and provide a signal associated with the vibrations experienced by the operator and/or the vehicle 10 to the site monitoring and control system 200.

As shown in FIG. 5, the sensors 90 additionally or alternatively include a linear position sensor (e.g., linear potentiometer, linear variable displacement transducer, etc.), shown as potentiometer 124, coupled to a suspension component of the suspension system 60 (e.g., shocks, dampers, springs, etc.). As shown in FIG. 5, a first potentiometer 124 is coupled to a component of the suspension system 60 proximate the rear tractive assembly 56, and a second potentiometer 124 is coupled to a component of the suspension system 60 proximate the front tractive assembly 58. In some embodiments, three or more potentiometers 124 are coupled to the vehicle 10 at various locations. The potentiometers 124 are configured to monitor a linear displacement of the suspension component to which the potentiometers 124 are coupled and provide signal associated with the linear displacement or oscillation of the suspension component to the site monitoring and control system 200.

The site monitoring and control system 200 may receive the vibration signal associated with the vibrations experienced by the vehicle 10 from the accelerometer 122 and/or the displacement signal associated with the linear displacement of the suspension component from the potentiometer 124. The site monitoring and control system 200 may determine the type of ground surface on which the vehicle 10 is operating based on the vibration signal and/or the displacement signal.

The type of ground surface that the vehicle 10 is operating on may be indicative of whether the vehicle 10 is operating in the restricted area defined by the geofence 314, or whether the vehicle 10 is operating in the drivable area outside of the geofence 314. The cart path 312 (the cart path 312 making up at least a portion of the drivable area) may be a paved surface made from asphalt, concrete, etc. In other embodiments, the cart path 312 may be a surface made from brick, gravel, crushed stone, etc. The areas making up at least a portion of the restricted area (e.g., the tee box 302, the fairway 304, the out-of-bounds area 306, the green 308, the hazard 310, etc.) may be a surface such as grass, fescue, pine, dirt, etc. that is a different type of surface than that of the cart path 312 (e.g., asphalt, concrete, stone, brick, etc.). The different types of surfaces (e.g., a drivable area surface, a restricted area surface, etc.) impart different responses of the vehicle 10 and the components thereof (e.g., different vibration profiles, different linear displacements, etc.) as the vehicle 10 traverses on the different types of surfaces.

Figure 6:
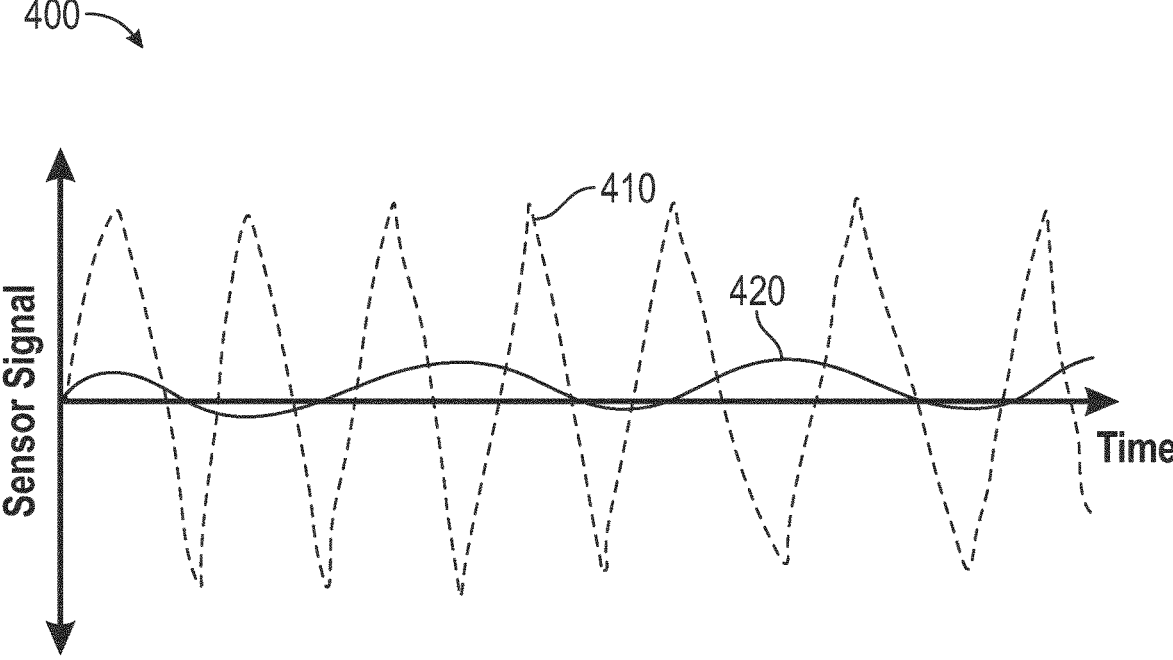
FIG. 6 is a graph of a signal from the sensor of FIG. 4 monitored over time, according to an exemplary embodiment.

As shown in FIG. 6, a graph 400 illustrates the sensor signal acquired by the sensors 90 and/or the user sensors 220 (e.g., the accelerometer 122, the potentiometer 124, etc.) and transmitted to the site monitoring and control system 200 when the vehicle 10 traverses on a drivable area surface (e.g., the cart path 312) and when the vehicle 10 traverses on a restricted area surface (e.g., the tee box 302, the fairway 304, the out-of-bounds area 306, the green 308, the hazard 310, etc.). In some embodiments, the graph 400 is an acceleration versus time graph. In some embodiments, the graph 400 is a frequency versus time graph. In some embodiments, the graph 400 is a linear displacement versus time graph.

As shown in FIG. 6, the graph 400 includes a first sensor signal (e.g., a characteristic profile, vibration profile, a frequency profile, etc.), shown as drivable area signal 410, provided by the sensors 90 and/or the user sensors 220 to the site monitoring and control system 200 when the vehicle 10 traverses on the drivable area surface. The graph 400 also includes a second sensor signal (e.g., a characteristic profile, vibration profile, a frequency profile, etc.), shown as restricted area signal 420, provided by the sensors 90 and/or the user sensors 220 to the site monitoring and control system 200 when the vehicle 10 traverses on the restricted area surface. Generally, the drivable area signal 410 defines a first profile (e.g., an oscillation pattern, frequency pattern, amplitude pattern, etc.) that is discernible from a second profile (e.g., an oscillation pattern, frequency pattern, amplitude pattern, etc.) defined by the restricted area signal 420. In some embodiments, the profile of the restricted area signal 420 has a longer wavelength and a shorter amplitude compared to the profile defined by the drivable area signal 410. For example, the cart path 312 may have a harder, bumpier surface that causes more vehicle vibrations and suspension oscillation, whereas the tee box 302, the fairway 304 (when treated as a restricted area such as when excessively wet), the green 308, and other restricted areas may have a softer, smoother surface that causes less vehicle vibrations and suspension oscillation. Accordingly, the site monitoring and control system 200 is configured to determine, based on the signal received by the sensors 90 and/or the user sensors 220, the type of ground surface on which the vehicle 10 is traveling. In some embodiments, the drivable area signal 410 and the restricted area signal 420 are predetermined patterns or profiles associated with the restricted area surface and the drivable area surface, respectively, that are stored in the memory 104, the memory 254, and/or the memory 264. In such an embodiment, the sensors 90 and/or user sensors 220 may transmit a signal associated with the characteristic of the vehicle 10 to the site monitoring and control system 200 and the site monitoring and control system 200 may be configured to compare the signal to one or more prestored drivable area profiles and one or more prestored restricted area profiles to determine whether the vehicle 10 is traveling on a restricted area surface or a drivable area surface.

The type of ground surface is indicative of whether the vehicle 10 is traveling in the restricted area or in the drivable area. By way of example, when the vehicle 10 is traveling on the cart path 312, the site monitoring and control system 200 may determine that the vehicle 10 is traveling on a drivable area surface, and is therefore traveling in the drivable area. By way of another example, when the vehicle 10 is traveling on the tee box 302, the fairway 304, the out-of-bounds area 306, the green 308, or the hazard 310, the site monitoring and control system 200 may determine that the vehicle 10 is traveling on a restricted area surface, and is therefore traveling in the restricted area. In some embodiments, the site monitoring and control system 200 may detect a change from receiving a signal similar to the restricted area signal 420 to receiving a signal similar to the drivable area signal 410 and determine, based on the change, that the vehicle 10 is or is not traveling in the restricted area or the drivable area. In some embodiments, the site monitoring and control system 200 is configured to determine, based on sensor data from the potentiometer 124, that the displacement of at least one of a rear tractive element of the rear tractive assembly 56, a front tractive element of the front tractive assembly 58, or a component of the suspension system 60 exceeds a threshold displacement, where exceeding the threshold displacement is indicative of the type of ground surface being the restricted area surface (e.g., an ungroomed landscape, a wooded area with large obstacle or bumps, etc.). In some embodiments, the site monitoring and control system 200 employs advanced calculation techniques, such as artificial intelligence, machine learning, neural networks, etc. to more accurately determine the type of ground surface on which the vehicle 10 is traveling based on the signal received by the sensors 90 and/or the user sensors 220. By way of example, the signal generated by the sensors 90 and/or the user sensors 220 associated with the characteristic of the vehicle 10 may be input into a machine learning model trained to determine the type of ground surface on which the vehicle 10 is traveling.

According to an exemplary embodiment, the site monitoring and control system 200 may permit operation of the vehicle 10 when the tracked location 318 indicates that that vehicle is located in the restricted area, but the type of surface that the vehicle 10 is traveling on indicates that the vehicle 10 is traveling in the drivable area. By way of example, the vehicle 10 may operate normally when the vehicle 10 is actually driving on the cart path 312, even though the tracked location 318 indicates that the vehicle 10 is located in a restricted area, such as the tee box 302, the fairway 304, the out-of-bounds area 306, the green 308, or the hazard 310. When the tracked location 318 indicates that that vehicle 10 is located in the drivable area, and the type of surface that the vehicle 10 is traveling on indicates that the vehicle 10 is traveling in the drivable area, the site monitoring and control system 200 may permit operation of the vehicle 10. When the tracked location 318 indicates that that vehicle 10 is located in the drivable area, but the type of surface that the vehicle 10 is traveling on indicates that the vehicle 10 is traveling in the restricted area, the site monitoring and control system 200 may limit operation of the vehicle 10. By way of example, the vehicle 10 may have limited operational capabilities when the vehicle 10 is located in a restricted area, such as the tee box 302, the fairway 304, the out-of-bounds area 306, the green 308, or the hazard 310, even though the tracked location 318 indicates that the vehicle 10 is in the drivable area (e.g., the cart path 312). When the tracked location 318 indicates that that vehicle 10 is located in the restricted area, and the type of surface that the vehicle 10 is traveling on indicates that the vehicle 10 is traveling in the restricted area, the site monitoring and control system 200 may limit operation of the vehicle 10.

According to an exemplary embodiment, the site monitoring and control system 200 may be configured to change or correct the tracked location 318 (e.g., compensate for GPS drift). By way of example, the site monitoring and control system 200 may be configured to force the tracked location 318 to be within the drivable area in response to a determination that the type of surface that the vehicle 10 is traveling on is the drivable area surface and the tracked location 318 indicates that the vehicle 10 is in the restricted area. By way of another example, the site monitoring and control system 200 may be configured to force the tracked location 318 to be within the restricted area in response to a determination that the type of surface that the vehicle is traveling on is a restricted area surface and the tracked location 318 indicates that the vehicle 10 is in the drivable area. In some embodiments, when (a) the determined area of the golf course 300 that the vehicle 10 is traveling in based on the type of surface the vehicle 10 is determined to be traveling on based on the data from the sensors 90 and/or the user sensors 220 is different than (b) the determined area of the golf course 300 that the vehicle 10 is traveling in based on the indication from the tracked location 318, the site monitoring and control system 200 may be configured to recalibrate (e.g., reset) the sensors 90 collecting the GPS data and/or RTK data and/or send a signal commanding the user sensors 220 to recalibrate. By way of example, when the tracked location 318 indicates that that vehicle 10 is located in the restricted area, but the type of surface that the vehicle 10 is traveling on indicates that the vehicle 10 is traveling in the drivable area, the site monitoring and control system 200 may recalibrate the sensors 90 collecting the GPS data and/or RTK data and/or send a signal commanding the user sensors 220 to recalibrate, which may update the tracked location 318 in response to the recalibration.

According to an exemplary embodiment, the memory 104, the memory 254, and/or the memory 264 store locations (e.g., coordinates) of where the site monitoring and control system 200 makes a determination that the type of surface that the vehicle 10 is traveling on is a drivable area surface. In such an embodiment, the site monitoring and control system 200 may be configured to update a boundary of the geofence 314 such that the geofence 314, or a portion thereof, is not defined around an area, or a portion thereof, determined to be the drivable area based on the type of surface. Similarly, in some embodiments, the memory 104, the memory 254, and/or the memory 264 store locations (e.g., coordinates) of where the site monitoring and control system 200 makes a determination that the type of surface that the vehicle 10 is traveling on is a restricted area surface. In such an embodiment, the site monitoring and control system 200 may be configured to update a boundary of the geofence 314 such that the geofence 314, or a portion thereof, is defined around an area determined to be the restricted area based on the type of surface. In some embodiments, the site monitoring and control system 200 is configured to transmit a signal to the user portal 230 to provide a warning (e.g., indication, instruction, etc.) to update the boundary of the geofence 314 (e.g., based on heavy rain the day before, etc.).

As shown in FIG. 7, a method 600 for operating the vehicle 10 includes steps 602-610. At step 602, a control system (e.g., the vehicle controller 100, the remote systems 204, off-site server 250, the on-site system 260, the site monitoring and control system 200, etc.) acquires position data indicative of a tracked location of a vehicle (e.g., a machine, the vehicle 10, a golf cart, a turf mower, a sprayer, a bunker rake, etc.) as the vehicle is driving on a ground surface to facilitate monitoring the location thereof. The position data may be acquired from a first sensor of the vehicle and/or operator (e.g., a GPS sensor, a position sensor, sensors 90, user sensors 220, etc.). At step 604, the control system acquires sensor data indicative of a surface type of the ground surface that the vehicle is driving on. The sensor data may be acquired by the control system from a second sensor of the vehicle and/or operator (e.g., the accelerometer 122, the potentiometer 124, sensors 90, user sensors 220, etc.). At step 606, the control system determines, based on the position data, that the tracked location indicates that the vehicle 10 is located in the restricted area. By way of example, the control system may determine that the vehicle is driving in an area defined by or surrounded by a restricted geofence. At step 608, the control system determines, based on the position data, the surface type (e.g., a restricted area surface, a drivable area surface, etc.) of the ground surface. At step 610, the control system permits operation of the vehicle 10 when the tracked location 318 indicates that the vehicle 10 is located in the restricted area (e.g., within the geofence 314), but the surface type indicates that the vehicle 10 is not located in the restricted area. The method 600, therefore, prevents unnecessarily limiting operation of the vehicle 10 when the location tracking system may be determining a false position for the vehicle 10 (e.g., due to external factors, due to component failure, etc.).

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the body 20, the operator controls 40, the driveline 50, the suspension system 60, the braking system 70, the sensors 90, the vehicle controller 100, etc.) and the site monitoring and control system 200 (e.g., the remote systems 240, the user portal 230, the user sensors 220, etc.) as shown in the various exemplary embodiments is illustrative only. Additionally, any element disclosed in one embodiment may be incorporated or utilized with any other embodiment disclosed herein.

The invention claimed is:

1. A vehicle system comprising:
a vehicle including:
a chassis;
a plurality of tractive assemblies coupled to the chassis, the plurality of tractive assemblies configured to engage a ground surface to support the vehicle;
a prime mover configured to drive one or more of the plurality of tractive assemblies;
a first sensor configured to facilitate monitoring a tracked location of the vehicle; and
a second sensor configured to facilitate detecting a surface type of the ground surface; and
a control system configured to:
monitor the tracked location of the vehicle based on a first signal acquired from the first sensor;
determine the surface type of the ground surface based on a second signal acquired from the second sensor; and
permit unrestricted operation of the vehicle when the tracked location indicates that the vehicle is located in a restricted operation area but the surface type indicates that the vehicle is not in the restricted operation area.

2. The vehicle system of claim 1, wherein the control system is configured to permit unrestricted operation of the vehicle when the tracked location indicates that the vehicle is not located in the restricted operation area and the surface type indicates that the vehicle is not in the restricted operation area.

3. The vehicle system of claim 2, wherein the control system is configured to limit operation of the vehicle when the tracked location indicates that the vehicle is not located in the restricted operation area but the surface type indicates that the vehicle is in the restricted operation area.

4. The vehicle system of claim 3, wherein the control system is configured to limit operation of the vehicle when the tracked location indicates that the vehicle is located in the restricted operation area and the surface type indicates that the vehicle is in the restricted operation area.

5. The vehicle system of claim 4, wherein, when the surface type indicates that the vehicle is on a cart path, the surface type is indicative of the vehicle not being in the restricted operation area.

6. The vehicle system of claim 1, wherein the restricted operation area is defined by a predetermined geofence.

7. The vehicle system of claim 1, wherein the control system includes one or more processing circuits including at least one of (a) a first processing circuit located on the vehicle or (b) a second processing circuit located remote from the vehicle.

8. The vehicle system of claim 1, wherein the vehicle is a golf cart, an all-terrain vehicle, a utility task vehicle, lightweight or recreational vehicle, a lawnmower, a turf mower, a push mower, a ride-on mower, a stand-on mower, aerator, a turf sprayer, or a bunker rake.

9. The vehicle system of claim 1, wherein the second sensor includes an accelerometer.

10. The vehicle system of claim 1, wherein the vehicle includes a suspension system, and wherein the second sensor includes a linear position sensor coupled to the suspension system.

11. A golf cart comprising:
a chassis;
a plurality of tractive assemblies, each tractive assembly of the plurality of tractive assemblies including a tractive element configured to engage a ground surface;
a suspension system coupling the plurality of tractive assemblies to the chassis;
a prime mover configured to drive one or more tractive elements of the plurality of tractive assemblies;
a sensor coupled to the golf cart, the sensor configured monitor a characteristic of the golf cart and provide a signal based on the characteristic; and
a controller configured to determine a type of the ground surface based on the signal and selectively limit or permit operation of the prime mover based on the type of the ground surface, thereby controlling operation of the golf cart based at least in part on a physical terrain on which the golf cart is operating.

12. The golf cart of claim 11, wherein the controller is configured to:
determine, based on the signal, that the type of the ground surface is a drivable area surface;
facilitate unrestricted operation of the prime mover in a first mode of operation in response to determining that the type of the ground surface is the drivable area surface;
determine, based on the signal, that the type of the ground surface is a restricted area surface; and
limit operation of the prime mover in a second mode of operation in response to determining that the type of the ground surface is the restricted area surface.

13. The golf cart of claim 12, wherein the controller is configured to:
compare the signal to a predetermined characteristic profile; and determine the type of the ground surface based on comparing the signal to the predetermined characteristic profile.

14. The golf cart of claim 12, wherein the controller is configured to:

receive an indication that the golf cart is located in a restricted area; and facilitate unrestricted operation of the prime mover in the first mode of operation in response to determining that the type of the ground surface is the drivable area surface even though the indication indicates that the golf cart is located in the restricted area.

15. The golf cart of claim 12, wherein the controller is configured to:

receive an indication that the golf cart is located in a restricted area; and limit operation of the prime mover in the second mode of operation in response to determining that the type of the ground surface is the restricted area surface and that the golf cart is located in the restricted area.

16. The golf cart of claim 12, wherein the controller is configured to:

receive an indication that the golf cart is located in a drivable area; and facilitate unrestricted operation of the prime mover in the first mode of operation in response to determining that the type of the ground surface is the drivable area surface and that the golf cart is located in the drivable area.

17. The golf cart of claim 12, wherein the controller is configured to:

receive an indication that the golf cart is located in a drivable area; and limit operation of the prime mover in the second mode of operation in response to determining that the type of the ground surface is the restricted area surface even though the indication indicates that the golf cart is located in the drivable area.

18. The golf cart of claim 11, wherein the sensor is an accelerometer, wherein the characteristic monitored by the accelerometer is a vibration experienced by the golf cart, and wherein the controller is configured to:

compare the signal from the accelerometer regarding the vibration with a first vibration profile associated with a restricted area surface and a second vibration profile associated with a drivable area surface; and determine whether the ground surface is the restricted area surface or the drivable area surface based on comparing the signal with the first vibration profile and the second vibration profile.

19. The golf cart of claim 11, wherein the sensor is a linear position sensor, wherein the characteristic monitored by the linear position sensor is a displacement of at least one of a respective tractive assembly of the plurality of tractive assemblies or the suspension system, wherein the controller is configured to limit operation of the prime mover in response to determining that the displacement of the at least one of the tractive assembly of the plurality of tractive assemblies or the suspension system exceeds a threshold displacement, and wherein exceeding the threshold displacement is indicative of the type of the ground surface being a restricted area surface.

20. A vehicle system comprising:

one or more processing circuits including one or more memory devices storing instructions thereon that, when executed by one or more processors, cause the one or more processors to:

acquire position data indicative of a tracked location of a vehicle as the vehicle is driving on a ground surface;

acquire sensor data indicative of a surface type of the ground surface;

determine, based on the position data, that the tracked location indicates that the vehicle is located in a restricted geofence;

determine, based on the sensor data, the surface type of the ground surface; and permit operation of the vehicle when the tracked location indicates that the vehicle is located in the restricted geofence but the surface type indicates that the vehicle is not within the restricted geofence.

* * * * *